(12) United States Patent
Murata

(10) Patent No.: US 8,614,999 B2
(45) Date of Patent: Dec. 24, 2013

(54) COMMUNICATION TERMINAL DEVICE, TFC SELECTION METHOD, AND PROGRAM

(75) Inventor: Yoshitaka Murata, Tokyo (JP)

(73) Assignee: NEC Corporation, Tokyo (JP)

( * ) Notice: Subject to any disclaimer, the term of this patent is extended or adjusted under 35 U.S.C. 154(b) by 633 days.

(21) Appl. No.: 12/528,032

(22) PCT Filed: Feb. 14, 2008

(86) PCT No.: PCT/JP2008/052912
§ 371 (c)(1),
(2), (4) Date: Aug. 20, 2009

(87) PCT Pub. No.: WO2008/102829
PCT Pub. Date: Aug. 28, 2008

(65) Prior Publication Data
US 2010/0067513 A1  Mar. 18, 2010

(30) Foreign Application Priority Data
Feb. 21, 2007  (JP) .................................. 2007-040135

(51) Int. Cl.
*H04B 7/216* (2006.01)

(52) U.S. Cl.
USPC ......................................................... 370/342

(58) Field of Classification Search
USPC ......................................................... 370/342
See application file for complete search history.

(56) References Cited

U.S. PATENT DOCUMENTS

| 2003/0193913 A1* | 10/2003 | Murata et al. | 370/332 |
| 2006/0183428 A1* | 8/2006 | Heo et al. | 455/67.11 |
| 2006/0217088 A1* | 9/2006 | Nagaoka et al. | 455/127.1 |

FOREIGN PATENT DOCUMENTS

| CN | 1771677 A | 5/2006 |
| JP | 2005252388 A | 9/2005 |
| JP | 2006253949 A | 9/2006 |

OTHER PUBLICATIONS

International Search Report for PCT/JP2008/052912 mailed Apr. 15, 2008.
3GPP TS25.211 V6.7.0, Technical Specification Group Radio Access Network, Physical channels and mapping of transport channels onto physical channels (FDD) (Release 6), Dec. 2005, Section 5.2.
3GPP TS25.133 V6.13.0, Technical Specification Group Radio Access Network, Requirement for support of radio resource management (FDD) (Release 6), Mar. 2006, Section 6.4.
3GPP TS25.133 V6.13.0, Technical Specification Group Radio Access Network, Requirement for support of radio resource management (FDD) (Release 6), Mar. 2006, Section 6.5.

(Continued)

*Primary Examiner* — Kenny Lin

(57) ABSTRACT

A communication terminal device is operable to multiplex a plurality of channel signals based on TFC (Transport Format Combination) selected by performing a TFC selection and transmit it. The communication terminal device includes a storage unit operable to store a plurality of combination of classifications to which the gain factors belong, as a combination of gain factors for weighting each of the plurality of channel signals, and to store a quantity of reduction of a maximum transmission power when the plurality of channel signals in association with each combination of the plurality of classifications are multiplexed and transmitted, and a TFC selection unit operable to select the TFC by reading out the quantity of reduction in association with the combination of the classification corresponding to the combination of the gain factors in each TFC from the storage unit when the TFC selection is performed.

12 Claims, 12 Drawing Sheets

(56) References Cited

OTHER PUBLICATIONS

3GPP TS25.101 V5,13.0, Technical Specification Group Radio Access Network, User Equipment (UE) radio transmission and reception (FDD) (Release 5), Dec. 2004, Section 6.2.2.

3GPP TS25.101 V6.11.0, Technical Specification Group Radio Access Network, User Equipment (UE) radio transmission and reception (FDD) (Release 6), Mar. 2006, Section 6.2.2.

3GPP TS25.214 V6.9.0, Technical Specification Group Radio Access Network, Physical layer procedures (FDD) (Release 6), Jun. 2006, Section 5.1.2.6.

Chinese Office Action for CN200880005921 issued Nov. 16, 2011.

* cited by examiner

| Signalled values for $\beta_c$ and $\beta_d$ | Quantized amplitude ratios $\beta_c$ and $\beta_d$ |
|---|---|
| 15 | 1.0 |
| 14 | 14/15 |
| 13 | 13/15 |
| 12 | 12/15 |
| 11 | 11/15 |
| 10 | 10/15 |
| 9 | 9/15 |
| 8 | 8/15 |
| 7 | 7/15 |
| 6 | 6/15 |
| 5 | 5/15 |
| 4 | 4/15 |
| 3 | 3/15 |
| 2 | 2/15 |
| 1 | 1/15 |
| 0 | Switch off |

| Signalled values for Δ$_{ACK}$, Δ$_{NACK}$ and Δ$_{CQI}$ | Quantized amplitude ratios $A_{hs} = \beta_{hs}/\beta_c$ |
|---|---|
| 8 | 30/15 |
| 7 | 24/15 |
| 6 | 19/15 |
| 5 | 15/15 |
| 4 | 12/15 |
| 3 | 9/15 |
| 2 | 8/15 |
| 1 | 6/15 |
| 0 | 5/15 |

FIG. 5

| Signalled values for Δ$_{E-DPCCH}$ | Quantized amplitude ratios $A_{ec} = \beta_{ec}/\beta_c$ |
|---|---|
| 8 | 30/15 |
| 7 | 24/15 |
| 6 | 19/15 |
| 5 | 15/15 |
| 4 | 12/15 |
| 3 | 9/15 |
| 2 | 8/15 |
| 1 | 6/15 |
| 0 | 5/15 |

FIG. 6

| Signalled values for Δ E-DPDCH | Quantized amplitude ratios $A_{ed} = \beta_{ed}/\beta_c$ |
|---|---|
| 29 | 168/15 |
| 28 | 150/15 |
| 27 | 134/15 |
| 26 | 119/15 |
| 25 | 106/15 |
| 24 | 95/15 |
| 23 | 84/15 |
| 22 | 75/15 |
| 21 | 67/15 |
| 20 | 60/15 |
| 19 | 53/15 |
| 18 | 47/15 |
| 17 | 42/15 |
| 16 | 38/15 |
| 15 | 34/15 |
| 14 | 30/15 |
| 13 | 27/15 |
| 12 | 24/15 |
| 11 | 21/15 |
| 10 | 19/15 |
| 9 | 17/15 |
| 8 | 15/15 |
| 7 | 13/15 |
| 6 | 12/15 |
| 5 | 11/15 |
| 4 | 9/15 |
| 3 | 8/15 |
| 2 | 7/15 |
| 1 | 6/15 |
| 0 | 5/15 |

FIG. 7

| Category | Signalled values for $\beta_c$ and $\beta_d$ | Quantized amplitude ratios $\beta_c$ and $\beta_d$ |
|---|---|---|
| 0 | 15 | 1.0 |
| 0 | 14 | 14/15 |
| 0 | 13 | 13/15 |
| 0 | 12 | 12/15 |
| 1 | 11 | 11/15 |
| 1 | 10 | 10/15 |
| 1 | 9 | 9/15 |
| 1 | 8 | 8/15 |
| 2 | 7 | 7/15 |
| 2 | 6 | 6/15 |
| 2 | 5 | 5/15 |
| 2 | 4 | 4/15 |
| 3 | 3 | 3/15 |
| 3 | 2 | 2/15 |
| 3 | 1 | 1/15 |
| 3 | 0 | Switch off |

FIG. 8

| Category | Signalled values for $\Delta_{ACK}$, $\Delta_{NACK}$ and $\Delta_{CQI}$ | Quantized amplitude ratios $A_{hs} = \beta_{hs}/\beta_c$ |
|---|---|---|
| 0 | 8 | 30/15 |
| 0 | 7 | 24/15 |
| 0 | 6 | 19/15 |
| 1 | 5 | 15/15 |
| 1 | 4 | 12/15 |
| 1 | 3 | 9/15 |
| 2 | 2 | 8/15 |
| 2 | 1 | 6/15 |
| 2 | 0 | 5/15 |

FIG. 9

| Category | Signalled values for Δ E-DPCCH | Quantized amplitude ratios $A_{ec} = \beta_{ec}/\beta_c$ |
|---|---|---|
| 0 | 8 | 30/15 |
| | 7 | 24/15 |
| | 6 | 19/15 |
| 1 | 5 | 15/15 |
| | 4 | 12/15 |
| | 3 | 9/15 |
| 2 | 2 | 8/15 |
| | 1 | 6/15 |
| | 0 | 5/15 |

FIG. 10

| Category | Signalled values for Δ E-DPDCH | Quantized amplitude ratios $A_{ed} = \beta_{ed}/\beta_c$ |
|---|---|---|
| 0 | 29 | 168/15 |
| | 28 | 150/15 |
| | 27 | 134/15 |
| | 26 | 119/15 |
| | 25 | 106/15 |
| 1 | 24 | 95/15 |
| | 23 | 84/15 |
| | 22 | 75/15 |
| | 21 | 67/15 |
| | 20 | 60/15 |
| 2 | 19 | 53/15 |
| | 18 | 47/15 |
| | 17 | 42/15 |
| | 16 | 38/15 |
| | 15 | 34/15 |
| 3 | 14 | 30/15 |
| | 13 | 27/15 |
| | 12 | 24/15 |
| | 11 | 21/15 |
| | 10 | 19/15 |
| 4 | 9 | 17/15 |
| | 8 | 15/15 |
| | 7 | 13/15 |
| | 6 | 12/15 |
| | 5 | 11/15 |
| 5 | 4 | 9/15 |
| | 3 | 8/15 |
| | 2 | 7/15 |
| | 1 | 6/15 |
| | 0 | 5/15 |

FIG. 11

| Index | βd | βhs | βec | βed | ETFC-MPR |
|---|---|---|---|---|---|
| 0 | 0 | 0 | 0 | 0 | ***** |
| 1 | 0 | 0 | 0 | 1 | ***** |
| 2 | 0 | 0 | 0 | 2 | ***** |
| 3 | 0 | 0 | 0 | 3 | ***** |
| 4 | 0 | 0 | 0 | 4 | ***** |
| 5 | 0 | 0 | 0 | 5 | ***** |
| 6 | 0 | 0 | 1 | 0 | ***** |
| 7 | 0 | 0 | 1 | 1 | ***** |
| 8 | 0 | 0 | 1 | 2 | ***** |
| 9 | 0 | 0 | 1 | 3 | ***** |
| 10 | 0 | 0 | 1 | 4 | ***** |
| 11 | 0 | 0 | 1 | 5 | ***** |
| 12 | 0 | 0 | 2 | 0 | ***** |
| 13 | 0 | 0 | 2 | 1 | ***** |
| 14 | 0 | 0 | 2 | 2 | ***** |
| 15 | 0 | 0 | 2 | 3 | ***** |
| 16 | 0 | 0 | 2 | 4 | ***** |
| 17 | 0 | 0 | 2 | 5 | ***** |
| 18 | 0 | 1 | 0 | 0 | ***** |
| 19 | 0 | 1 | 0 | 1 | ***** |
| 20 | 0 | 1 | 0 | 2 | ***** |
| 21 | 0 | 1 | 0 | 3 | ***** |
| 22 | 0 | 1 | 0 | 4 | ***** |
| 23 | 0 | 1 | 0 | 5 | ***** |
| 24 | 0 | 1 | 1 | 0 | ***** |
| 25 | 0 | 1 | 1 | 1 | ***** |
| 26 | 0 | 1 | 1 | 2 | ***** |
| 27 | 0 | 1 | 1 | 3 | ***** |
| 28 | 0 | 1 | 1 | 4 | ***** |
| 29 | 0 | 1 | 1 | 5 | ***** |
| 30 | 0 | 1 | 2 | 0 | ***** |
| 31 | 0 | 1 | 2 | 1 | ***** |
| 32 | 0 | 1 | 2 | 2 | ***** |
| 33 | 0 | 1 | 2 | 3 | ***** |
| 34 | 0 | 1 | 2 | 4 | ***** |
| 35 | 0 | 1 | 2 | 5 | ***** |

⋮

FIG. 12

# COMMUNICATION TERMINAL DEVICE, TFC SELECTION METHOD, AND PROGRAM

This application is the National Phase of PCT/JP2008/052912, filed Feb. 14, 2008, which is based upon and claims the benefit of priority from Japanese patent application No. 2007-040135, filed on Feb. 21, 2007, the disclosure of which is incorporated herein in its entirety by reference.

TECHNICAL FIELD

The present invention relates to a communication terminal device, a TFC (Transport Format Combination) selection method, and a program. More particularly, the present invention relates to a communication terminal device operable to perform a TFC selection to multiplex and transmit a plurality of channel signals based on a selected TFC.

BACKGROUND ART

For an up-link from a UE (User Equipment) to a base station, 3GPP (3$^{rd}$ Generation Partnership Project), which has developed and proposed the W-CDMA (Wideband-Code Division Multiple Access) standard, has defined a DPDCH (Dedicated Physical Data Channel) as a data transfer channel and a DPCCH (Dedicated Physical Control Channel) as a control data channel (see Non-patent Document 1).

Furthermore, 3GPP Release 6 has additionally defined HSUPA (High Speed Uplink Packet Access) as a method to achieve high-data-rate uplink transfer. As shown in FIG. 1, the HSUPA achieves high-speed data communication by code-multiplexing an E-DPDCH (Enhanced Dedicated Physical Data Channel) as a data transfer channel and an E-DPCCH (Enhanced Dedicated Physical Control Channel) as a control data channel for the E-DPDCH additionally on uplink channels of the related W-CDMA (see Non-patent Document 1). Although FIG. 1 is a diagram showing a configuration of an HSUPA transmission system according to an exemplary embodiment of the present invention, that configuration is basically the same as a system configuration in the related art except an E-TFC selection controller 106.

Furthermore, there has been defined to code-multiplex an HS-DPCCH (High Speed Dedicated Physical Control Channel) for HSDPA (High Speed Downlink Packet Access) additionally on an uplink channel of the related W-CDMA for transfer of data re-transmission information or the like.

In an uplink of the W-CDMA, there are functions including a TFC (Transport Format Combination) selection for determining an optimum transmission rate of a DCH (Dedicated Channel) that conforms to a radio wave environment or a maximum permissible transmission power and an E-TFC (Enhanced Transport Format Combination) selection for determining an optimum transmission rate of an E-DCH (Enhanced Dedicated Channel) (see Non-patent Document 2).

When the number of transmission channels code-multiplexed is increased as described above, a PAR (Peak to Average power Ratio), which is a ratio of a peak power and an average power of a transmission signal, is increased such that distortion is caused in a PA (Power Amplifier), resulting in degradation of an ACLR (Adjacent Channel Leakage power Ratio).

In order to improve this situation, it is necessary to calculate a correction value to a maximum transmission power to obtain a maximum permissible transmission power (a quantity of reduction from the Maximum transmission power). For this correction value, an MPR (Max Power Reduction) conforming to a PAR is defined (see Non-patent Document 3).

The number of uplink channels multiplexed has been small for UEs until the 3GPP Release 5 HSDPA. Thus, the 3GPP has defined the specification for reducing a maximum transmission power in a fixed manner according to an amplitude value ($\beta$d) of a DPDCH. Three fixed values are stored and used for a quantity of reduction from a maximum transmission power according to a combination of $\beta$d in a look-up table (see Non-patent Document 4). For a TFC selection, an optimum TFC has been selected by using those three quantities of reduction according to $\beta$d.

Meanwhile, the number of channels code-multiplexed has been increased in the 3GPP Release 6 HSUPA, so that the number of $\beta$-combinations that can be multiplexed has explosively been increased. If a look-up table is used to determine a quantity of reduction, it is difficult to perform simple case classification. Therefore, there has been defined to sample a transmission waveform at a downstream side of an FIR (Finite Impulse Response) filter 103 which has been subjected to diffusion and filtering with respect to a determined $\beta$-combination so as to calculate a CM (Cubic Metric) and then an MPR, rather than to refer to an MPR from a $\beta$-combination in advance as in Release 5 (see Non-patent Document 5). However, this process imposes a large load. Therefore, if this process were to be performed just before transmission, the circuit would be complicated and increased in scale.

Non-patent Document 1: 3GPP Release 6 TS25.211 (v6.7.0) 5.2
Non-patent Document 2: 3GPP Release 6 TS25.133 (v6.13.0) 6.4
Non-patent Document 3: 3GPP Release 6 TS25.133 (v6.13.0) 6.5
Non-patent Document 4: 3GPP Release 5 TS25.101 (v5.13.0) 6.2.2
Non-patent Document 5: 3GPP Release 6 TS25.101 (v6.11.0) 6.2.2
Non-patent Document 6: 3GPP Release 6 TS25.214 (v6.9.0) 5.1.2.6

DISCLOSURE OF INVENTION

An amplitude $\beta$ed of an E-DPDCH that has been determined based on an E-TFC selected by an E-TFC selection is used to calculate a CM and then an MPR.

Here, when an E-TFC selection is performed with use of a value smaller than an actual MPR as an E-TFC-MPR, which is a temporary correction value for an E-TFC selection, to determine an optimum transmission rate, then an E-DPDCH power may selectively be reduced at the final stage depending on an actual MPR value calculated from a CM (see Non-patent Document 6).

Conversely, when an E-TFC selection is performed with use of a value larger than an actual MPR as an E-TFC-MPR to determine an optimum transmission rate, then the transmission rate may be determined to be less than a maximum transmission power, resulting in a throughput lower than an ideal one.

An optimum throughput can be obtained by an E-TFC selection optimized in one way or another with use of an E-TFC-MPR that can be approximated to a CM at the time of the E-TFC selection.

An object of the present invention is to provide a communication terminal device, a TFC selection method, and a program which can perform an optimum TFC selection.

A communication terminal device according to an exemplary aspect of the present invention is operable to multiplex a plurality of channel signals based on TFC (Transport Format Combination) selected by performing a TFC selection and transmit it. The communication terminal device is characterized by including: a storage unit operable to store a plurality of combinations of classifications to which gain factors belong, as combinations of gain factors for weighting each of the plurality of channel signals, and to store a quantity of reduction of a maximum transmission power when the plurality of channel signals in association with each combination of the plurality of classifications are multiplexed and transmitted; and a TFC selection unit operable to select the preceding TFC by reading out the quantity of reduction in association with the combination of the classification corresponding to the combination of the gain factors in each TFC from the storage unit when the TFC selection is performed.

Furthermore, a TFC (Transport Format Combination) selection method according to another exemplary aspect of the present invention is used in a communication terminal device operable to multiplex a plurality of channel signals based on TFC selected by performing a TFC selection and transmit it. The TFC selection method is characterized by including: a step of reading out, from a storage unit operable to store a plurality of combinations of classifications to which gain factors belong, as combination of gain factors for weighting each of the plurality of channel signals, and to store a quantity of reduction of a maximum transmission power when the plurality of channel signals in association with each combination of the plurality of classifications are multiplexed and transmitted, the quantity of reduction in association with the combination of the classification corresponding to the combination of the gain factors in each TFC when the TFC selection is performed.

Moreover, a program according to still another exemplary aspect of the present invention is used for executing, with a computer, a TFC (Transport Format Combination) selection method in a communication terminal device operable to multiplex a plurality of channel signals based on TFC selected by performing a TFC selection and transmit it. The program is characterized by including: a process of reading out, from a storage unit operable to store a plurality of combinations of classifications to which gain factors belong, as a combination of gain factors for weighting each of the plurality of channel signals, and to store a quantity of reduction of a maximum transmission power when the plurality of channel signals in association with each combination of the plurality of classifications are multiplexed and transmitted, the quantity of reduction in association with the combination of the classification corresponding to the combination of the gain factors in each TFC when the preceding TFC selection is performed.

Thus, according to the present invention, values of gain factors are grouped into a plurality of classifications. Combinations of the gain factors are stored in the form of combinations of the classifications in a storage unit. A quantity of reduction from a maximum transmission power is prestored in association with each of the combinations of the classifications. Then a quantity of reduction in association with a combination of the classifications corresponding to a combination of the gain factors in each TFC to be judged is read from the storage unit for performing a TFC selection. With this configuration, an optimum TFC selection can be performed.

BRIEF DESCRIPTION OF DRAWINGS

FIG. 5 is a diagram showing a quantization table of $\beta hs/\beta c$;

FIG. 6 is a diagram showing a quantization table of $\beta ec/\beta c$;

FIG. 7 is a diagram showing a quantization table of $\beta ed/\beta c$;

FIG. 8 is a diagram in which values in the quantization table of FIG. 4 have been grouped into several categories;

FIG. 9 is a diagram in which values in the quantization table of FIG. 5 have been grouped into several categories;

FIG. 10 is a diagram in which values in the quantization table of FIG. 6 have been grouped into several categories;

FIG. 11 is a diagram in which values in the quantization table of FIG. 7 have been grouped into several categories;

FIG. 12 is a diagram showing an example of an MPR memory in FIG. 3;

BEST MODE FOR CARRYING OUT THE INVENTION

An exemplary embodiment of the present invention will be described below with reference to the drawings.

Figure 1:
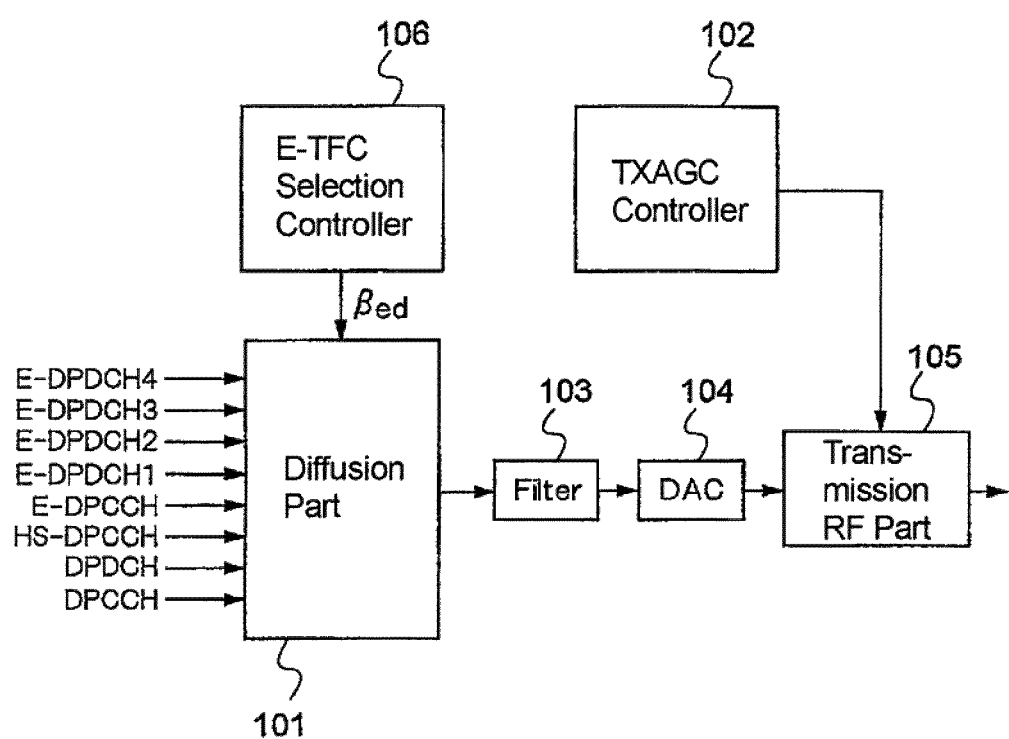
FIG. 1 is a diagram showing a configuration of an HSUPA transmission system according to an exemplary embodiment of the present invention.

FIG. 1 is a diagram showing a configuration of an HSUPA transmission system according to an exemplary embodiment of the present invention. As shown in FIG. 1, the HSUPA transmission system according to the embodiment of the present invention includes a diffusion part 101, a TXAGC (Transmission Auto Gain Control) controller 102, an FIR filter 103, a DAC (Digital/Analog Converter) 104, a transmission RF (Radio Frequency) part 105, and an E-TFC selection controller 106. The HSUPA transmission system is applied to a mobile station in a mobile communication system.

Figure 2:
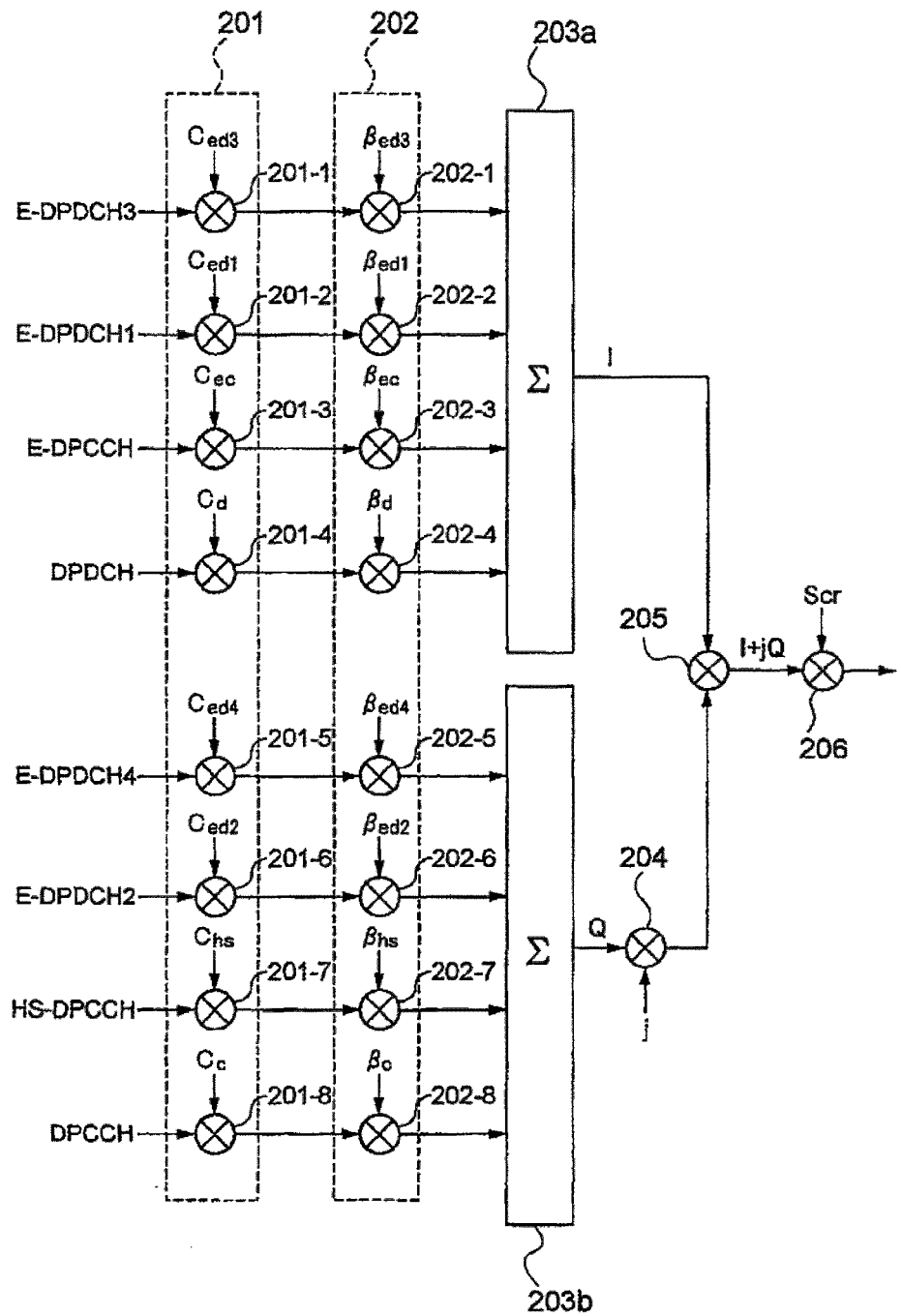
FIG. 2 is a diagram showing a configuration of a diffusion part in FIG. 1.

FIG. 2 is a diagram showing a configuration of the diffusion part 101 in FIG. 1. As shown in FIGS. 1 and 2, in the present embodiment, signals in channels including a DPCCH, a DPDCH, an HS-DPCCH, an E-DPCCH, and E-DPDCHs 1-4 are code-multiplexed and transmitted. Signals of an E-DPDCH 3, an E-DPDCH 1, an E-DPCCH, a DPDCH, an E-DPDCH 4, an E-DPDCH 2, an HS-DPCCH, and a DPCCH are subjected to a diffusion process with a channelization code C by computing units 201-1 to 201-8, respectively, and then weighted with gain factors (gain parameters) $\beta ed3$, $\beta ed1$, $\beta ec$, $\beta d$, $\beta ed4$, $\beta ed2$, $\beta hs$, and $\beta c$ by computing units 202-1 to 202-8, respectively.

Figures 3, 4:
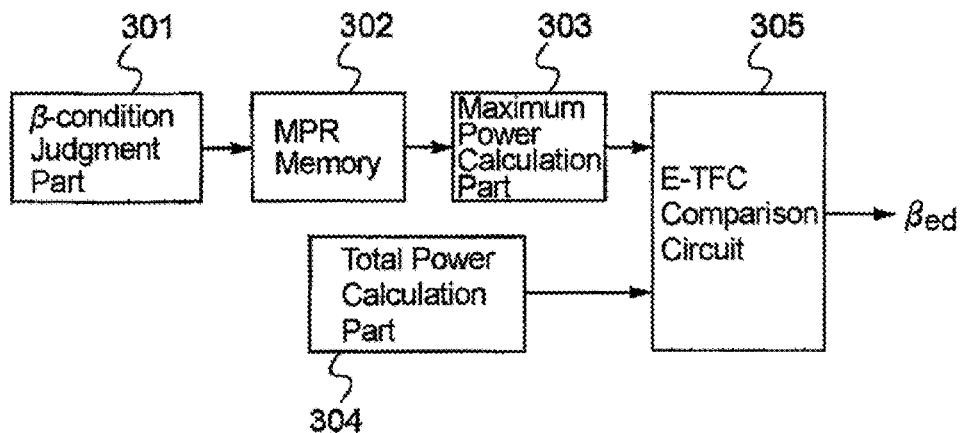
FIG. 3 is a diagram showing a configuration of an E-TFC selection controller in FIG. 1.
FIG. 4 is a diagram showing a quantization table of $\beta c$ and $\beta d$.

Values of the gain factors $\beta$ are defined relative to $\beta c$ by 3GPP (3GPP Release 6 TS25.213 (v6.5.0) 4.2) and shown in FIGS. 4 to 7. FIG. 4 is a diagram showing a quantization table of $\beta c$ and $\beta d$, FIG. 5 is a diagram showing a quantization table of $\beta hs/\beta c$, FIG. 6 is a diagram showing a quantization table of $\beta ec/\beta c$, and FIG. 7 is a diagram showing a quantization table of $\beta ed/\beta c$.

An adder 203a adds the outputs of the computing units 202-1 to 202-4 up and outputs the added signal as an I-branch. An adder 203b adds the outputs of the computing units 202-5 to 202-8 up and outputs the added signal as a Q-branch. A computing unit 204 multiplies the output signal of the adder 203b by an imaginary number j. A computing unit 205 performs a complex addition of the output signal of the adder 203a and the output signal of the computing unit 204. The output of the computing unit 205 is subjected to a diffusion process with a scrambling code Scr in a computing unit 206.

The FIR filter 103 is a root-raised-cosine filter for band limitation. The DAC 104 is operable to convert a digital signal from the FIR filter 103 into an analog signal. The transmission RF part 105 performs a frequency up-conversion on the analog transmission signal from the DAC 104, amplifies its power with a PA (Power Amplifier), and performs a radio transmission through an antenna. The transmission RF part 105 has functions of receiving a TXAGC signal from the TXAGC controller 102 and adjusting its gain.

FIG. 3 is a diagram showing a configuration of the E-TFC selection controller 106 in FIG. 1. In FIG. 3, the E-TFC selection controller 106 includes a condition judgment part 301, an MPR memory 302, a maximum power calculation part 303, a total power calculation part 304, and an E-TFC comparison circuit 305. Here, the MPR memory 302 serves as a storage means or a storage unit. Furthermore, the E-TFC comparison circuit 305 serves as a TFC selection means or a TFC selection unit along with the maximum power calculation part 303 and the total power calculation part 304.

In order to calculate an E-TFC-MPR that can be approximated to a CM (Cubic Metric) in advance, the CM is calculated in advance through a simulation by sampling a transmission waveform downstream of diffusion and filtering from each β-combination. The result is stored as an E-TFC-MPR in the MPR memory 302.

There are β-combinations as shown in FIGS. 4 to 7. Additionally, the number of β-combinations becomes enormous including multi-code multiplex of E-DPDCHs and parameters in a compressed mode. Thus, it is not practical to hold all combinations in the memory 302.

Therefore, in the embodiment of the present invention, β values are divided into a plurality of categories (classifications) as shown FIGS. 8 to 11. Those divisions are performed such that each category includes a plurality of β values. FIGS. 8 to 11 correspond to FIGS. 4 to 7, respectively. As shown in an example of the MPR memory 302 in FIG. 12, a plurality of combinations of categories to which β values belong are prestored in the MPR memory 302 for combinations of those β values. Furthermore, E-TFC-MPR values are prestored in association with the combinations of the categories in the MPR memory 302.

In FIG. 12, for example, Index 0 includes a combination of Category 0 for βd, Category 0 for βhs, Category 0 for βec, and Category 0 for βed and an E-TFC-MPR value corresponding to that combination. Index 35 includes a combination of Category 0 for βd, Category 1 for βhs, Category 2 for βec, and Category 5 for βed and an E-TFC-MPR value corresponding to that combination. Thus, combinations of β values are held as combinations of corresponding categories in association with E-TFC-MPR values, so that the memory size can be optimized in consideration of a tradeoff between precision of the E-TFC-MPR and the memory size.

Each of the E-TFC-MPR values is calculated based on values arbitrarily selected from each of categories included in the corresponding combination. In Index 0, for example, a value is arbitrarily selected as a representative value from Category 0 for βd (e.g., the central value in the category or a value near the center in the category). Furthermore, a value is arbitrarily selected as a representative value from Category 0 for each of βhs, βec, and βed. Then a CM is calculated through a simulation by sampling a transmission waveform downstream of diffusion and filtering from the β-combination of the selected representative values. The computation result is stored as an E-TFC-MPR for Index 0 in the MPR memory 302.

Referring back to FIG. 3, the β-condition judgment part 301 determines a category of each β value in an E-TFC to be judged. An E-TFC-MPR corresponding to the combination of the determined categories for the β values is read from the MPR memory 302. The maximum power calculation part 303 subtracts the E-TFC-MPR from the maximum transmission power so as to calculate a maximum permissible transmission power. The maximum transmission power is determined by the power class (3GPP Release 6 TS25.101 (v6.b.0) 6.2.1).

The total power calculation part 304 performs calculation of the formula (1) to compute a power offset.

$$PowerOffset = 10\log\left(\frac{\beta_c^2 + \beta_d^2 + \beta_{hs}^2 + \beta_{ec}^2 + \beta_{ed1}^2 + \beta_{ed2}^2 + \beta_{ed3}^2 + \beta_{ed4}^2}{\beta_c^2}\right) \quad (1)$$

Furthermore, the total power calculation part 304 calculates a DPCCH power to be based and calculates a total transmission power of the E-TFC to be judged (=(the power offset+the DPCCH power)).

The E-TFC comparison circuit 305 compares the maximum permissible transmission power calculated by the maximum power calculation part 303 with the total transmission power calculated by the total power calculation part 304 to determine whether the E-TFC being judged is to be supported or blocked, i.e., whether the E-TFC can be transmitted or cannot be transmitted.

Figure 13:
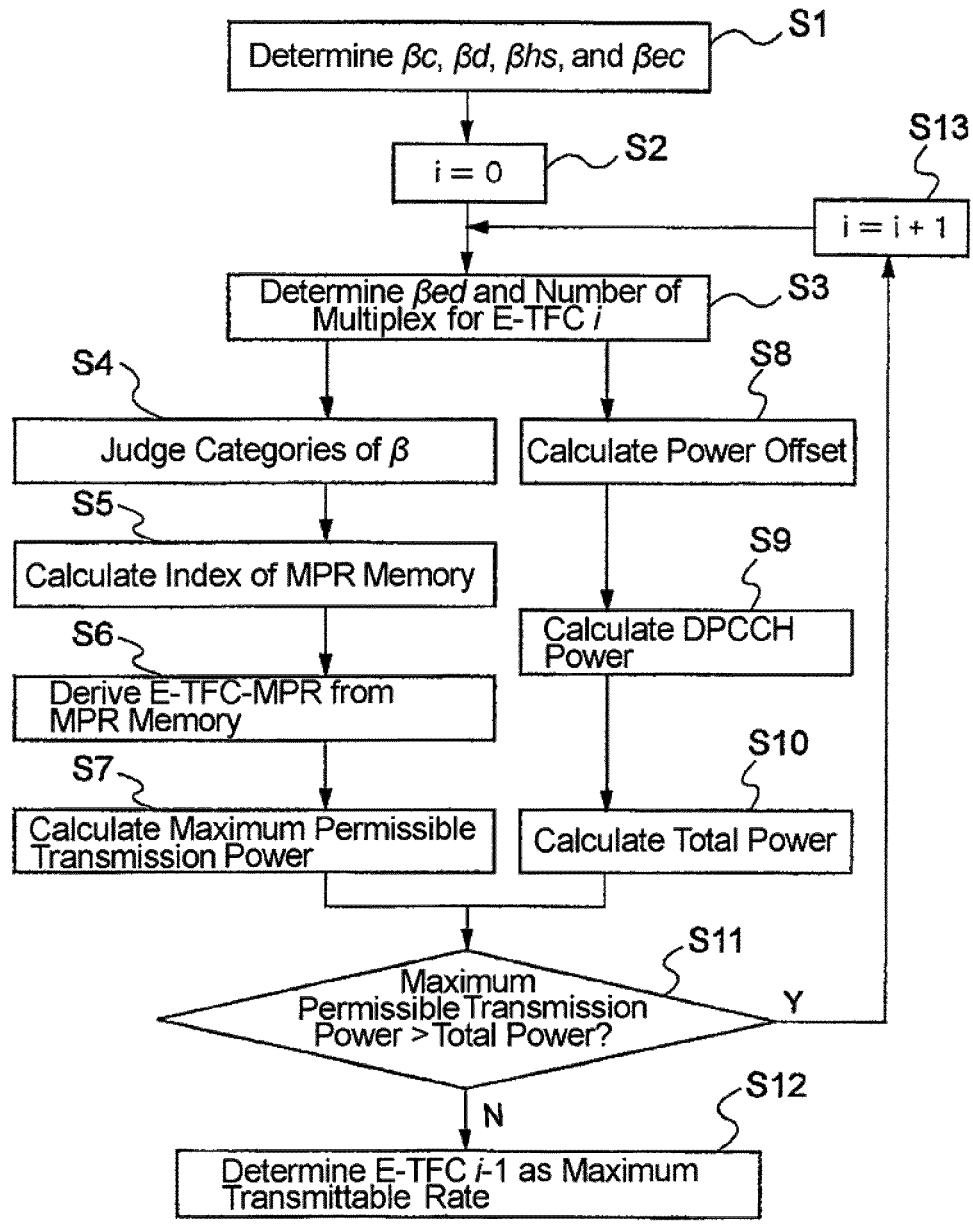
FIG. 13 is a flow chart showing operation of an HSUPA transmission system according to an exemplary embodiment of the present invention.
Figure 14:
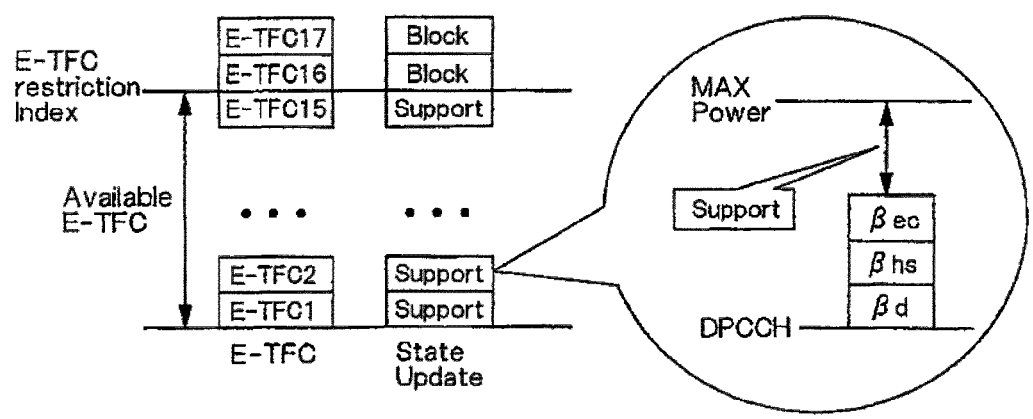
FIG. 14 is a diagram explanatory of a judgment operation in an E-TFC comparison circuit of FIG. 1.
Figure 15:
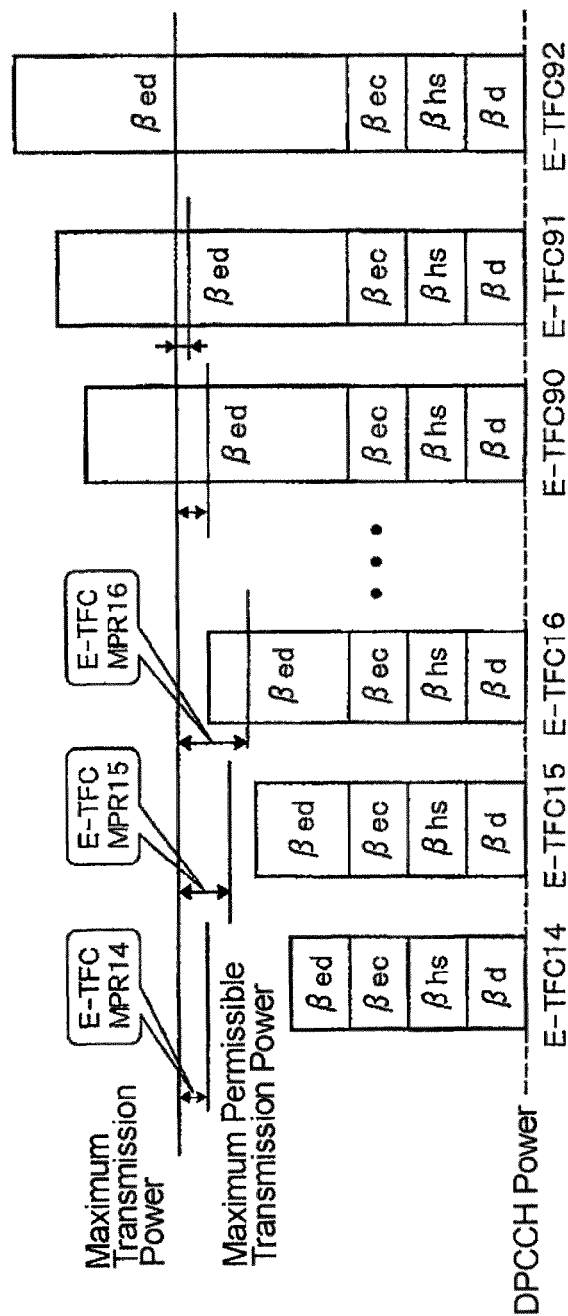
FIG. 15 is a diagram explanatory of the judgment operation in the E-TFC comparison circuit of FIG. 1.

Operation of an HSUPA transmission system according to the embodiment of the present invention will be described with reference to the drawings. FIG. 13 is a flow chart showing operation of the HSUPA transmission system shown in FIG. 1. FIGS. 14 and 15 are diagrams explanatory of a judgment operation in the E-TFC comparison circuit 305 of FIG. 1.

In FIG. 13 for an E-TFC selection, βc, βd, βhs, and βec are determined by an upper layer (Step S1). Next, a parameter is set such that i=0 (Step S2). In Step S3, an E-TFC in an E-TFCS (Enhanced Transport Format Combination Set), which is a set of all E-TFCs, and the number of the E-DPDCHs and a value of βed for i are calculated (3GPP Release 6 TS25.212 4.8.4.1; 3GPP Release 6 TS25.214 5.1.2.5B).

As shown in the examples of FIGS. 8 to 11, the β-condition judgment part 301 judges categories of βd/βc, βhs/βc, βec/βc, βed1/βc, βed2/βc, βed3/βc, and βed4/βc (Step S4), which have been determined in Steps S1 and S2. Furthermore, the β-condition judgment part 301 calculates a corresponding index in the MPR memory 302 from the categories judged for β (Step S5) and derives an E-TFC-MPR corresponding to the index from the MPR memory 302 (Step S6). The maximum power calculation part 303 calculates a maximum permissible transmission power (Step S7), which is a difference between the maximum transmission power and the E-TFC-MPR.

Furthermore, the total power calculation part 304 performs calculation of the formula (1) to compute a power offset (Step S8), calculates a DPCCH power in which a proximate radio wave environment is leveled (Step S9), and calculates the total transmission power of E-TFC i (=(the power offset+the DPCCH power)) (Step S10).

The E-TFC comparison circuit 305 judges whether the total transmission power of E-TFC i exceeds the maximum permissible transmission power (Step S11). As shown in FIGS. 14 and 15, if the transmission power of E-TFC i (E-TFC 16 in the example shown in FIGS. 14 and 15) exceeds the maximum permissible transmission power, then the E-TFC comparison circuit 305 sets E-TFC i in a block state, i.e., judges that E-TFC i cannot be transmitted, and determines that E-TFC i−1 is a maximum transmittable rate (Step S12).

Meanwhile, as shown in FIGS. 14 and 15, if the total transmission power of E-TFC i (each of E-TFCs 1-15 in the example shown in FIGS. 14 and 15) does not exceed the maximum permissible transmission power, then the E-TFC comparison circuit 305 sets E-TFC i in a support state, i.e., judges that E-TFC i can be transmitted, and sets the parameter for judgment of the next E-TFC so that i=i+1 (Step S13). Then the processes in Steps S3 to S11 are repeated.

As described above; possible E-TFCs that can be transmitted are narrowed (to E-TFCs 1-15 in the example shown in FIGS. 14 and 15) by the processes in accordance with the flow of FIG. 13. Those possible E-TFCs are reported to the MAC layer, so that one optimum E-TFC is determined from those possible E-TFCs by the MAC process. The corresponding βed is outputted to the diffusion part 101. This process does not directly relate to the present invention, and the details thereof are omitted herein.

As described above, according to the embodiment of the present invention, β values are divided into a plurality of categories. A combination of categories to which β values belong is used for a combination of those β values. Each combination of a plurality of categories is associated with an E-TFC-MPR value and prestored in an MPR memory 302. Therefore, an E-TFC-MPR that is close to an actual MPR conforming to a PAR can effectively be used for an E-TFC selection. Thus, it is possible to determine an appropriate maximum transmission rate.

Accordingly, a selectively reduction of an E-DPDCH power, which would be caused if a transmission rate higher than the maximum permissible transmission rate were selected, is prevented. As a result, CRC NG is prevented. Furthermore, a useless reduction of a performance throughput, which would be caused if a transmission rate lower than the maximum permissible transmission rate were selected, is prevented.

As a matter of course, the process operation of a UE according to the flow chart shown in FIG. 13 can be implemented by a UE that reads and executes a program stored on a storage medium such as a ROM with a computer having a CPU (controller).

Furthermore, the present embodiment has been described with an example of an E-TFC selection. Nevertheless, the present invention is not limited to an E-TFC selection. The present invention is also applicable to a TFC selection that takes into consideration a quantity of reduction from a maximum transmission power by a PAR with regard to general CDMA transmitters. For example, the present invention can be applied to a TFC selection for determining an optimum transmission rate of a DCH.

In this case, when a plurality of combinations of categories to which β values belong are associated with MPR values and prestored in a memory, a TFC selection can readily be performed with high accuracy. In contrast thereto, one of the related methods as described above merely selects a MPR from three values, and its accuracy is low. Furthermore, as described above, a method of sampling a transmission waveform downstream of the FIR filter 103 to calculate a CM and then an MPR has been defined as another related method. However, this process imposes a large load, and if such process were to be performed just before transmission, the circuit would be complicated and increased in scale.

The invention claimed is:

1. A communication terminal device operable to multiplex a plurality of channel signals based on TFC (Transport Format Combination) selected by performing a TFC selection and transmit it, characterized by including:
a storage unit which stores a plurality of combinations of classifications to which gain factors belong, as combinations of the gain factors for weighting the plurality of channel signals, and stores a quantity of reduction of a maximum transmission power, used when the plurality of channel signals are multiplexed and transmitted, in association with each combination of the plurality of classifications; and
a TFC selection unit which selects the TFC by reading out the quantity of reduction in association with the combination of the classification corresponding to the combination of the gain factors in each TFC from the storage unit when the TFC selection is performed.

2. The communication terminal device as recited in claim 1, characterized in that each of the classifications includes a plurality of gain factors.

3. The communication terminal device as recited in claim 2, characterized in that the quantity of reduction stored in the storage unit is a value obtained from optional one value selected from each of the classifications configuring the corresponding combination.

4. The communication terminal device as recited in claim 1, characterized in that the TFC selection unit performs the TFC selection by comparing a maximum permissible transmission power, which is a difference between the maximum transmission power and the quantity of reduction, with a total transmission power of the TFC.

5. The communication terminal device as recited in claim 1, wherein the gain factors comprise three or more kinds.

6. A TFC (Transport Format Combination) selection method in a communication terminal device operable to multiplex a plurality of channel signals based on TFC selected by performing a TFC selection and transmit it, characterized by including:
a step of reading out, from storage unit which stores a plurality of combinations of classifications to which gain factors belong, as combinations of the gain factors for weighting the plurality of channel signals, and stores a quantity of reduction of a maximum transmission power; used when the plurality of channel signals are multiplexed and transmitted, in association with each combination of the plurality of classifications, the quantity of reduction in association with the combination of the classification corresponding to the combination of the gain factors in each TFC when the TFC selection is performed.

7. The TFC selection method as recited in claim 6, characterized in that each of the classifications includes a plurality of gain factors.

8. The TFC selection method as recited in claim 7, characterized in that the quantity of reduction stored in the storage unit is a value obtained from optional one value selected from each of the classifications configuring the corresponding combination.

9. The TFC selection method as recited in claim 6, characterized by further comprising a step of performing the TFC selection by comparing a maximum permissible transmission power, which is a difference between the maximum transmission power and the quantity of reduction, with a total transmission power of the TFC.

10. The TFC selection method as recited in claim 6, wherein the gain factors comprise three or more kinds.

11. A computer readable non-transitory medium embodied thereon a program for executing, with a computer, a TFC (Transport Format Combination) selection method in a communication terminal device operable to multiplex a plurality of channel signals based on TFC selected by performing a TFC selection and transmit it, characterized by including:

a process of reading out, from storage unit which stores a plurality of combinations of classifications to which gain factors belong, as combinations of the gain factors for weighting the plurality of channel signals, and stores a quantity of reduction of a maximum transmission power used when the plurality of channel signals are multiplexed and transmitted, in association with each combination of the plurality of classifications, the quantity of reduction in association with the combination of the classification corresponding to the combination of the gain factors in each TFC when the TFC selection is performed.

12. The computer readable non-transitory medium as recited in claim 11, wherein the gain factors comprise three or more kinds.

* * * * *